J. F. SMATHERS.
TYPE WRITING MACHINE.
APPLICATION FILED APR. 18, 1912.
1,077,005.
Patented Oct. 28, 1913.
2 SHEETS—SHEET 2.
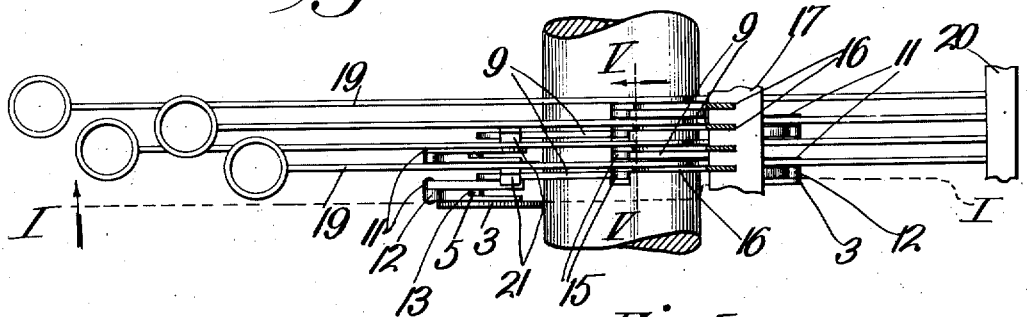
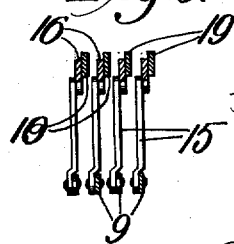
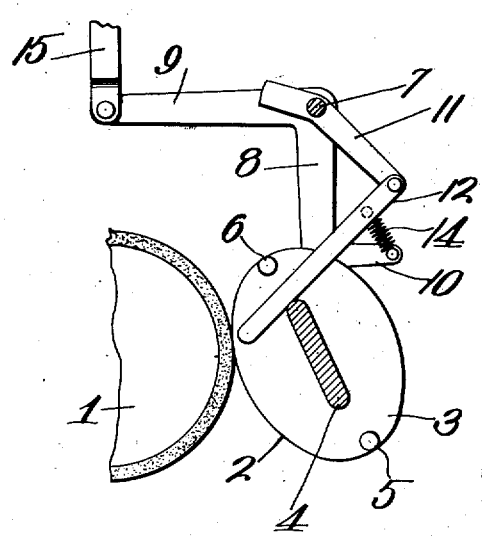
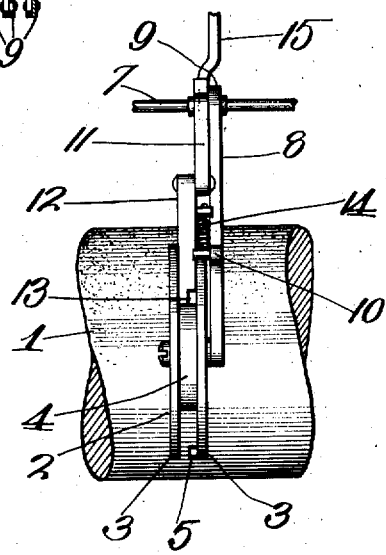
Witnesses
Frank R Glow
H. C. Rodgers.
Inventor
J. F. Smathers
By George Thorpe Atty.

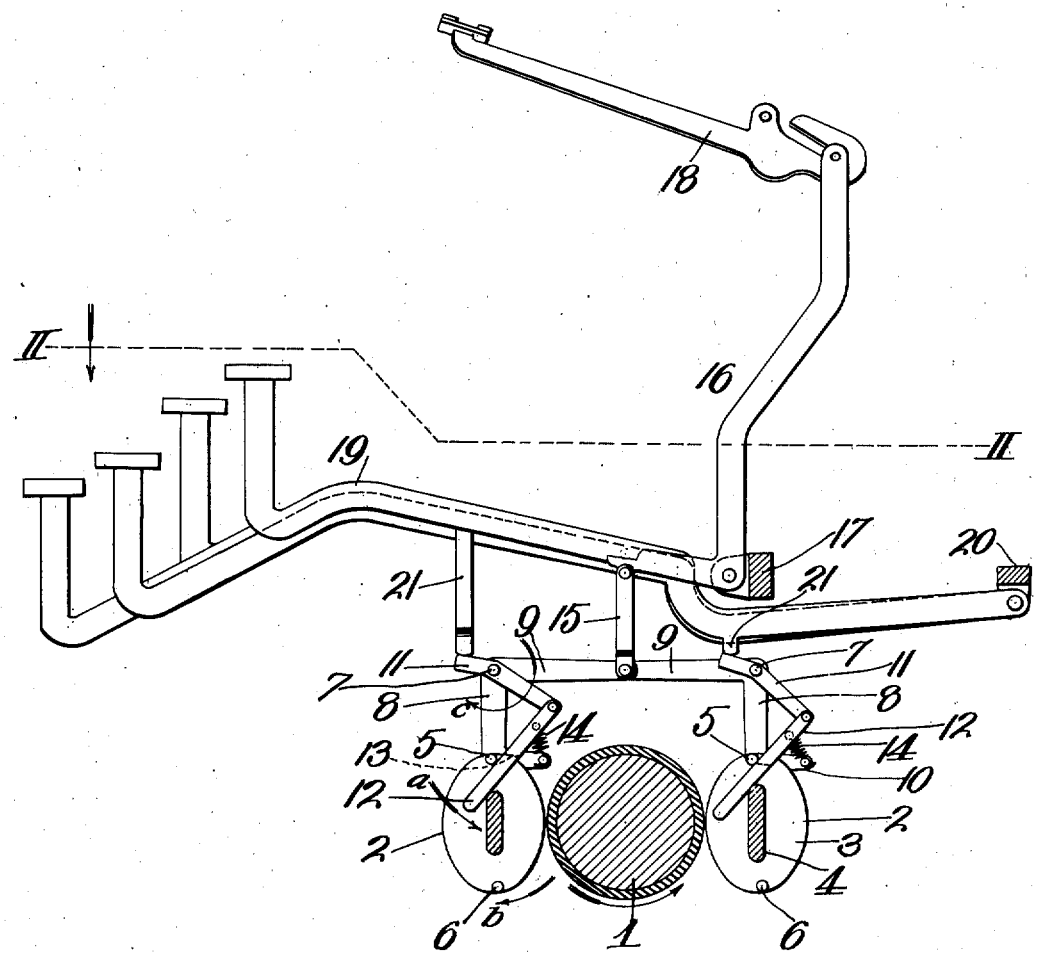

UNITED STATES PATENT OFFICE.

JAMES F. SMATHERS, OF KANSAS CITY, MISSOURI.

TYPE-WRITING MACHINE.

1,077,005.  Specification of Letters Patent.  Patented Oct. 28, 1913.

Application filed April 18, 1912. Serial No. 691,747.

*To all whom it may concern:*

Be it known that I, JAMES F. SMATHERS, a citizen of the United States, residing at Kansas City, in the county of Jackson and State of Missouri, have invented certain new and useful Improvements in Type-Writing Machines, of which the following is a specification.

This invention relates to typewriting machines, and has for its object to produce a machine which can be operated with less power and therefore less fatigue than is required for the operation of any of the approved typewriting machines on the market.

More specifically my object is to produce a machine provided with power-driven means for operating the type bars and with manually-operable keys for throwing the corresponding type bars in gear with such driven means.

A still further object is to produce a machine in which the type bars will be operated with uniform force irrespective of the speed or power with which the keys are manually depressed.

With these objects in view, the invention consists in certain novel and peculiar features of construction and organization as hereinafter described and claimed; and in order that it may be fully understood reference is to be had to the accompanying drawings, in which—

Figure 1, is a vertical section of part of a typewriting machine embodying my invention, on the line I—I of Fig. 2. Fig. 2, is a horizontal section on the line II—II of Fig. 1. Fig. 3, is an enlarged section of a part of the mechanism in the same plane as Fig. 1, with certain parts in different positions of adjustment. Fig. 4 is a rear view of the construction shown by Fig. 3. Fig. 5, is a vertical section on the line V—V of Fig. 2.

In the said drawings, 1 indicates a driven roller adapted for rotation by a motor or its equivalent, not shown, the roller in the arrangement shown, turning in the direction indicated by the parelleling arrow, Fig. 1. 2 is an elliptic wheel consisting of two elliptic plates or sides 3, connected by an elongated hub 4. There will be a wheel of this character for each key of the machine and for compactness some of the wheels will be at one side and the remainder at the opposite side of roller 1, and each wheel will be provided near its periphery and at opposite ends of and spaced from the hub, with pins 5 and 6, projecting about half way from one of the sides 3 to the other side 3.

7 is a horizontal pivot rod, in fixed relation to each series of wheels 2, and pivoted on each rod 7, are bell crank levers in number corresponding to the adjacent wheels, each of the latter being journaled on one of the arms of the bell crank lever. As shown the wheels are journaled on the arms 8 of the bell crank levers and the arms 9 extend inwardly with respect to the roller 1, and each arm 8 is provided with a short arm 10.

11 are rock levers corresponding in number to the bell crank levers and pivoted between their ends on the same rods 7, and pivoted to each of said rock levers is a bar 12, which extends into the adjacent wheel 2, the portion of each lever extending into a wheel, being cut away at 13 in order that the pins 5 and 6 may pass the bar under conditions hereinafter named, and connecting arms 10 of the bell crank levers to the bars 12, are springs 14, for the purpose of imparting turning movement to said wheels after the rock levers, through manual operation as hereinafter explained, are operated to slide bars 12, for the purpose of unlocking the wheels, as hereinafter explained.

15 are bars pivoted to the arms 9 of the bell crank levers, for transmitting power from the latter through any suitable mechanism, to the type bars of the machine. As shown in the drawings the bars 15 are pull-bars, that is to say, they are pivoted to the bell crank levers 16, fulcrumed on a suitable common support 17, and connected to the type bars 18. The arrangement of the parts 16 and 18 inclusive is substantially that of the Underwood typewriting machine.

For tripping the rock levers for the purpose of unlocking the wheels as hereinafter explained, key levers 19 are shown as fulcrumed on a supporting bar 20, and said levers are provided with depending portions 21 to engage the rock levers 11, the customary springs for holding the key levers elevated, being omitted. In Fig. 1. one of the key levers is shown as depressed, with the engaged rock lever 11 operated, and the connected bar 12 withdrawn until its cut away portion is opposite the pin 5 of the engaged wheel 2, and the connected spring 14 is tensioned and therefore tending to swing bar 12 in the direction indicated by the arrow *a* Fig. 1. The instant this tripping action occurs, the free end of said bar exerts pressure on the wheel to turn the same in the direction indicated by the arrow *b*, Fig. 1, and thus press the periphery of wheel 2 against roller 1. As this occurs the roller imparts rotation to the said wheel in the direction indicated by the said arrow *b*, and, because of the elliptic form of the wheel, the supporting or carrying bell crank swings in the direction indicated by the arrow *c*, and thus exerts a downward pull on the connected bar 15, and through the connections described, effects operative movement of the associated type bar. The wheel continues to turn because the force of gravity tends to hold it against roller 1, until it completes a half revolution, and then it is instantly arrested because its pin 6 comes in contact with bar 12 above the cut-away portion of the latter. It is to be understood in this connection that shortly after the revolution of the wheel 2 begins the key lever is released to permit to return bar 12 and rock lever 11 to their initial positions. By holding the key lever depressed the operation of the type bar will be repeated. This is a desirable feature for any work where it is necessary to operate a type bar a number of times in succession, as in underscoring. It will also be understood that the type bar ends its stroke as the periphery of wheel 2, at a point adjacent to pin 5, attains the horizontal plane of the axis of roller 1, and that during the second quarter revolution of said wheel, the bell crank lever and the type bar and their connections, return to their initial positions. It will thus be seen that the operator need apply only sufficient force on the key lever to trip bar 12 from its locking position and that the actuation of the type bars is effected by the driven roller, and it is also apparent that irrespective of the rapidity with which the key levers are operated, the type bars strike with uniform force. The operation described is the same with each wheel and the connected mechanism. In Fig. 3 one of the wheels is shown in the position it occupies just before it completes a half revolution, and the pin 6 by impingement against bar 12 above the cut-away portion thereof, clamps bar 12 against the hub 4 and thus through said bar, arrests and holds the wheel stationary until the connected rock lever is again operated through the operation of the proper key lever.

From the above description it will be apparent that I have produced a mechanism whereby the tripping of the locking bar shall effect the transmission of power from a driven roller to a type bar, which is applicable under suitable modifications to any of the other approved types of typewriting machines on the market, and it is to be understood that I reserve the right to make all changes properly falling within the scope of the appended claims.

I claim:

1. In an automatic typewriting machine, the combination with a driven roller, of a movable type-bar operating device, an elliptic wheel movable with and journaled on said device, means normally interlocked with the wheel, and means to cause the first-named means when not interlocked with the wheel to turn the latter until near its point of smallest diameter it peripherally engages the roller and is rotated thereby.

2. In an automatic typewriting machine, the combination with a driven roller, of a movable type-bar operating device, an elliptic wheel movable with and journaled on said device, an endwise movable bar interlocked with the wheel, and means to cause said bar when not interlocked with the wheel to turn the latter until it peripherally engages the roller and is simultaneously rotated and moved bodily by the latter.

3. In an automatic typewriting machine, the combination with a driven roller, of a movable type-bar operating device, an elliptic wheel movable with and journaled on said device, means normally interlocked with the wheel, a key lever, and means actuated by the key lever to cause said first-named means when not interlocked with the wheel to turn the latter until it peripherally engages the roller and is simultaneously rotated and moved bodily thereby.

4. In an automatic typewriting machine, the combination of a driven roller, a pivoted type-bar operating device, an elliptic wheel journaled on the free end of said device, and adapted for movement bodily toward and from said roller, means normally interlocked with the wheel, and means to cause the first-named means when not interlocked with the wheel, to turn the latter until it peripherally engages the roller and is rotated thereby, said pivoted device holding the wheel pressed yieldingly against the roller until the former completes a half revolution.

5. In an automatic typewriting machine, the combination of a driven roller, a movable type-bar operating device, an elliptic wheel movable with and journaled on said device, and adapted to swing with said device toward and from the roller, a bar interlocked with the wheel and normally holding the same stationary, means to withdraw said bar from its interlocked relation with the wheel, and yielding means for causing the wheel as it is unlocked to turn the wheel until it peripherally engages the roller.

6. In an automatic typewriting machine, the combination of a driven roller, a swinging type-bar operating device, an elliptic wheel journaled on and adapted to swing with said device and provided with a hub elongated in the direction of the greatest diameter of the wheel and with a pair of diametrically opposite pins spaced from the hub, a bar extending between the hub and one of the said pins and normally engaged at opposite edges thereby, and provided with a cut-away portion, means holding said bar yieldingly advanced so that its cut-away portion shall be inward of the circular path of travel of said pins, and means to move the bar to dispose the cut-away portion in said circular path of travel, said first-named means acting to cause the bar when it occupies the last-named position, to press upon the hub and turn the wheel until its periphery engages the periphery of the roller and the said engaging pin has passed through said cut-away portion of the bar.

7. In an automatic typewriting machine, the combination with a driven roller, a key lever and a type bar, of a movable device, a device journaled on and carried by and movable with the movable device and of unequal radial dimensions, means actuated by the operation of the key lever, for causing said journaled device to turn and peripherally engage and be rotated by the roller and also be moved bodily, thereby to impart movement to said movable device and means whereby such movement of said movable device shall cause the type bar to make its printing stroke.

8. In an automatic typewriting machine, the combination with a driven roller, a type bar and key lever, of a movable device, an elliptic wheel movable with and journaled on said device, means actuated by the operation of the key lever, for causing the wheel to engage and be rotated and moved bodily by the roller and to impart movement to said movable device, and means whereby such movement of said device shall operate the type bar.

9. In an automatic typewriting machine, the combination with a driven roller, of a movable type-bar operating device, an elliptic wheel movable with and journaled on said device, a rock lever, a key lever for actuating said rock lever, a bar pivoted at one end to the rock lever and interlocked with said wheel to hold the same against rotation and adapted to be withdrawn to unlocking position through the actuation of said rock lever by the key lever, and a spring for causing said bar when in unlocked position to turn the wheel until it peripherally engages said roller and is revolved and moved bodily thereby.

In testimony whereof I affix my signature, in the presence of two witnesses.

JAMES F. SMATHERS.

Witnesses:
HELEN C. RODGERS,
G. Y. THORPE.

EXTENSION OF PATENT.

Patent No. 1,077,005.

Granted October 28, 1913.

JAMES F. SMATHERS.

The above entitled patent has been extended, under the provisions of the Act of May 31, 1928, for five years and fifty-three days from the expiration of the original term thereof.

Thomas E. Robertson

Commissioner of Patents.

October 7, 1929.

with said device and provided with a hub elongated in the direction of the greatest diameter of the wheel and with a pair of diametrically opposite pins spaced from the hub, a bar extending between the hub and one of the said pins and normally engaged at opposite edges thereby, and provided with a cut-away portion, means holding said bar yieldingly advanced so that its cut-away portion shall be inward of the circular path of travel of said pins, and means to move the bar to dispose the cut-away portion in said circular path of travel, said first-named means acting to cause the bar when it occupies the last-named position, to press upon the hub and turn the wheel until its periphery engages the periphery of the roller and the said engaging pin has passed through said cut-away portion of the bar.

7. In an automatic typewriting machine, the combination with a driven roller, a key lever and a type bar, of a movable device, a device journaled on and carried by and movable with the movable device and of unequal radial dimensions, means actuated by the operation of the key lever, for causing said journaled device to turn and peripherally engage and be rotated by the roller and also be moved bodily, thereby to impart movement to said movable device and means whereby such movement of said movable device shall cause the type bar to make its printing stroke.

8. In an automatic typewriting machine, the combination with a driven roller, a type bar and key lever, of a movable device, an elliptic wheel movable with and journaled on said device, means actuated by the operation of the key lever, for causing the wheel to engage and be rotated and moved bodily by the roller and to impart movement to said movable device, and means whereby such movement of said device shall operate the type bar.

9. In an automatic typewriting machine, the combination with a driven roller, of a movable type-bar operating device, an elliptic wheel movable with and journaled on said device, a rock lever, a key lever for actuating said rock lever, a bar pivoted at one end to the rock lever and interlocked with said wheel to hold the same against rotation and adapted to be withdrawn to unlocking position through the actuation of said rock lever by the key lever, and a spring for causing said bar when in unlocked position to turn the wheel until it peripherally engages said roller and is revolved and moved bodily thereby.

In testimony whereof I affix my signature, in the presence of two witnesses.

JAMES F. SMATHERS.

Witnesses:
HELEN C. RODGERS,
G. Y. THORPE.

EXTENSION OF PATENT.

Patent No. 1,077,005.  
Granted October 28, 1913.

JAMES F. SMATHERS.

The above entitled patent has been extended, under the provisions of the Act of May 31, 1928, for five years and fifty-three days from the expiration of the original term thereof.

Thomas E. Robertson

Commissioner of Patents.

October 7, 1929.

EXTENSION OF PATENT.

Patent No. 1,077,005.

Granted October 28, 1913.

JAMES F. SMATHERS.

The above entitled patent has been extended, under the provisions of the Act of May 31, 1928, for five years and fifty-three days from the expiration of the original term thereof.

*Thomas E. Robertson*

Commissioner of Patents.

October 7, 1929.